(12) United States Patent
Jensen et al.

(10) Patent No.: US 8,628,211 B2
(45) Date of Patent: Jan. 14, 2014

(54) COMPACT SOLAR LIGHT ASSEMBLY

(75) Inventors: William Mark Jensen, St Louis, MO (US); Heath A Doty, St Louis, MO (US)

(73) Assignee: Jensen Group, LLC, St. Louis, MO (US)

( * ) Notice: Subject to any disclaimer, the term of this patent is extended or adjusted under 35 U.S.C. 154(b) by 177 days.

(21) Appl. No.: 13/280,390

(22) Filed: Oct. 25, 2011

(65) Prior Publication Data

US 2012/0106142 A1 May 3, 2012

Related U.S. Application Data

(60) Provisional application No. 61/407,512, filed on Oct. 28, 2010.

(51) Int. Cl.
F21L 4/04 (2006.01)

(52) U.S. Cl.
USPC ............ 362/197; 362/190; 362/198; 362/199

(58) Field of Classification Search
USPC ............ 362/23–30, 184, 581, 253, 428, 365, 362/362, 177, 196–199, 450, 523, 109, 800, 362/640, 555, 557, 372, 396, 543–545, 157, 362/183, 162, 181, 188–191, 194–195, 362/200–205, 219–225, 647, 217.1, 217.17, 362/311.01, 311.02, 352–353, 645–659, 362/427, 430, 433–434, 418–420, 312, 367, 362/234–240, 249.01–249, 19, 249.14, 362/268–270, 275–283, 285, 287, 319

See application file for complete search history.

(56) References Cited

U.S. PATENT DOCUMENTS

| | | | | |
|---|---|---|---|---|
| 5,438,488 A | * | 8/1995 | Dion | 362/103 |
| 8,113,687 B2 | * | 2/2012 | Villard et al. | 362/249.01 |
| 8,240,868 B1 | * | 8/2012 | Sims | 362/104 |
| 2007/0002561 A1 | * | 1/2007 | Tesmer et al. | 362/183 |

* cited by examiner

*Primary Examiner* — Anh Mai
*Assistant Examiner* — Fatima Farokhrooz
(74) *Attorney, Agent, or Firm* — The Small Patent Law Group LLC; Dean Small

(57) ABSTRACT

A lighting assembly is provided including a support member configured to engage an object that is to be illuminated. A solar cell is rotatably joined to the support member. A lighting member is powered by the solar cell. The lighting member is rotatably joined to the support member to position a light provided in the lighting member.

34 Claims, 12 Drawing Sheets

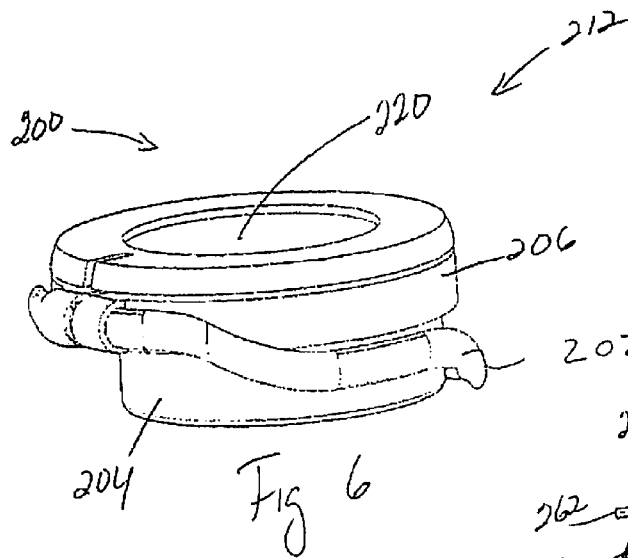
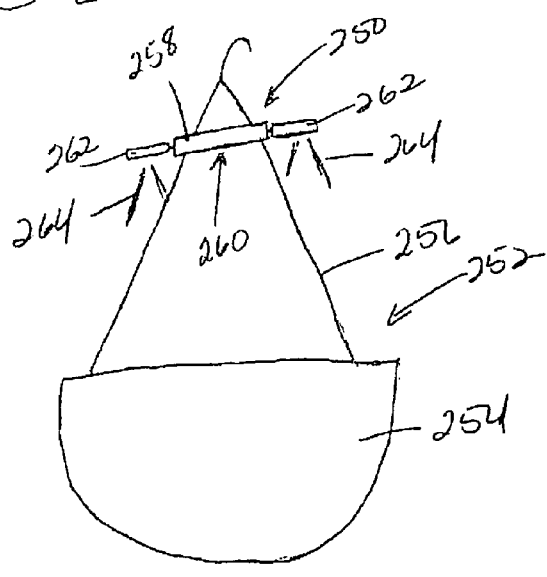
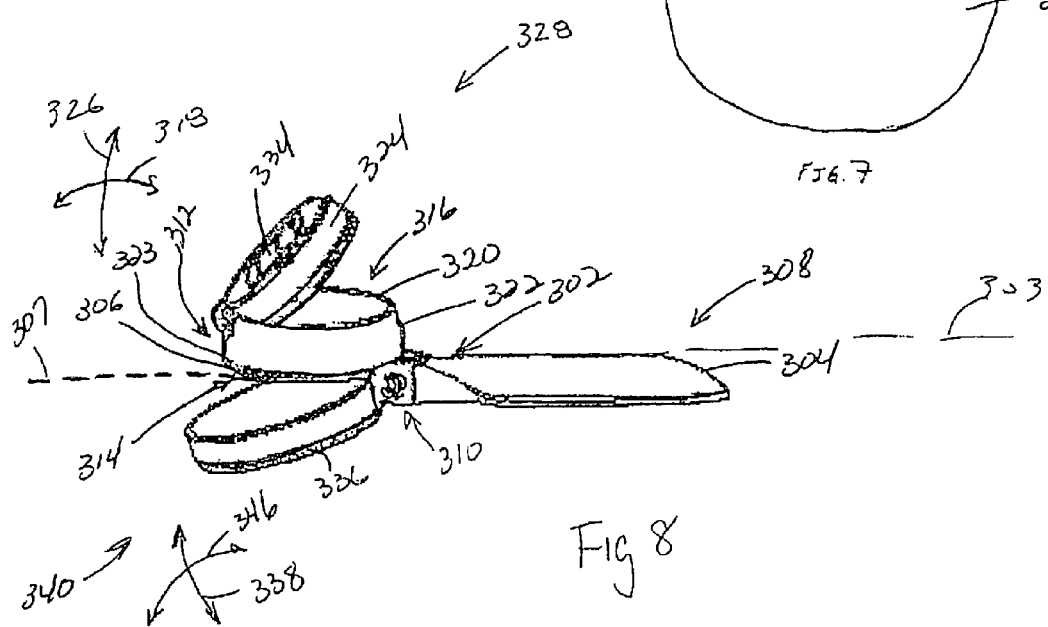

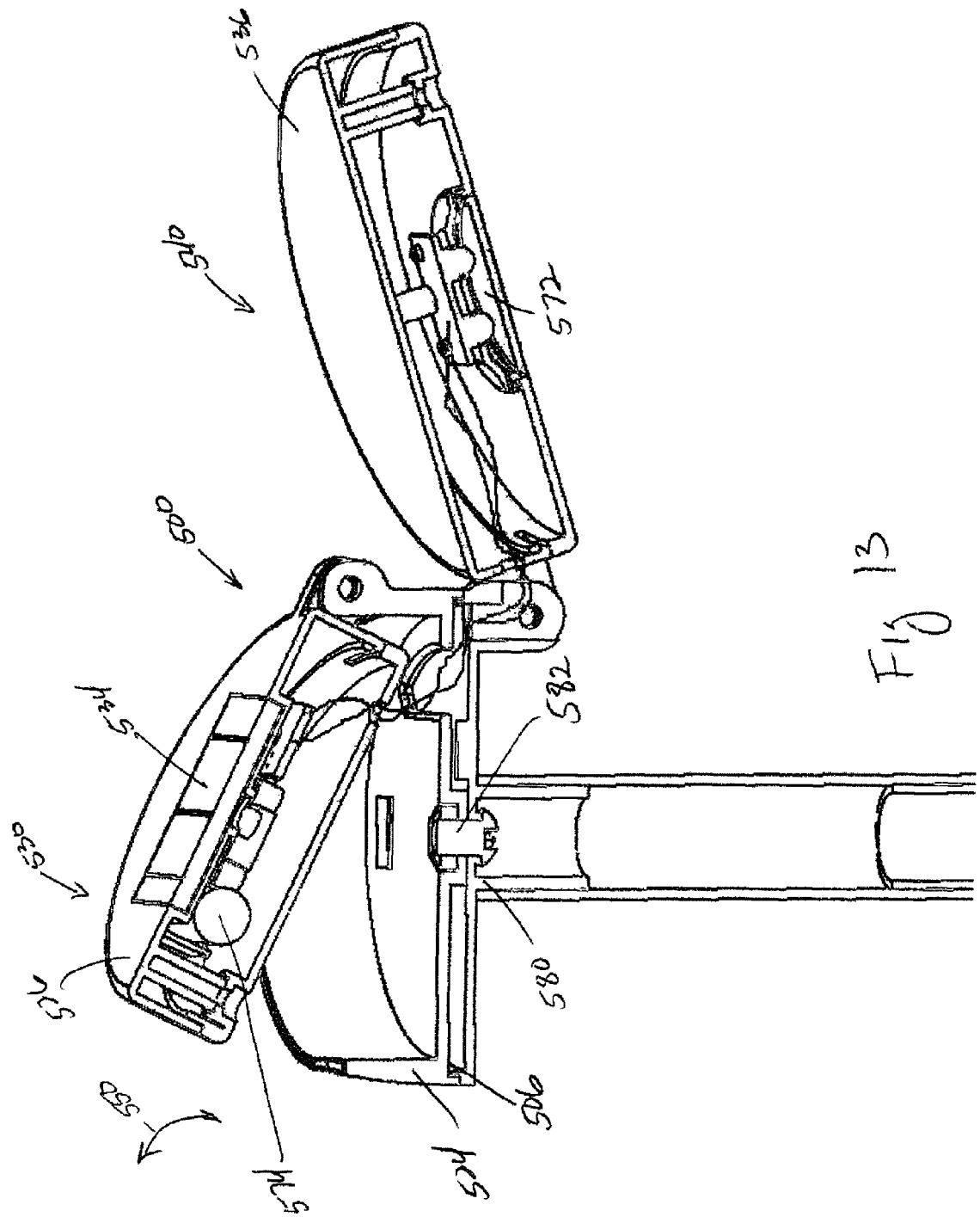

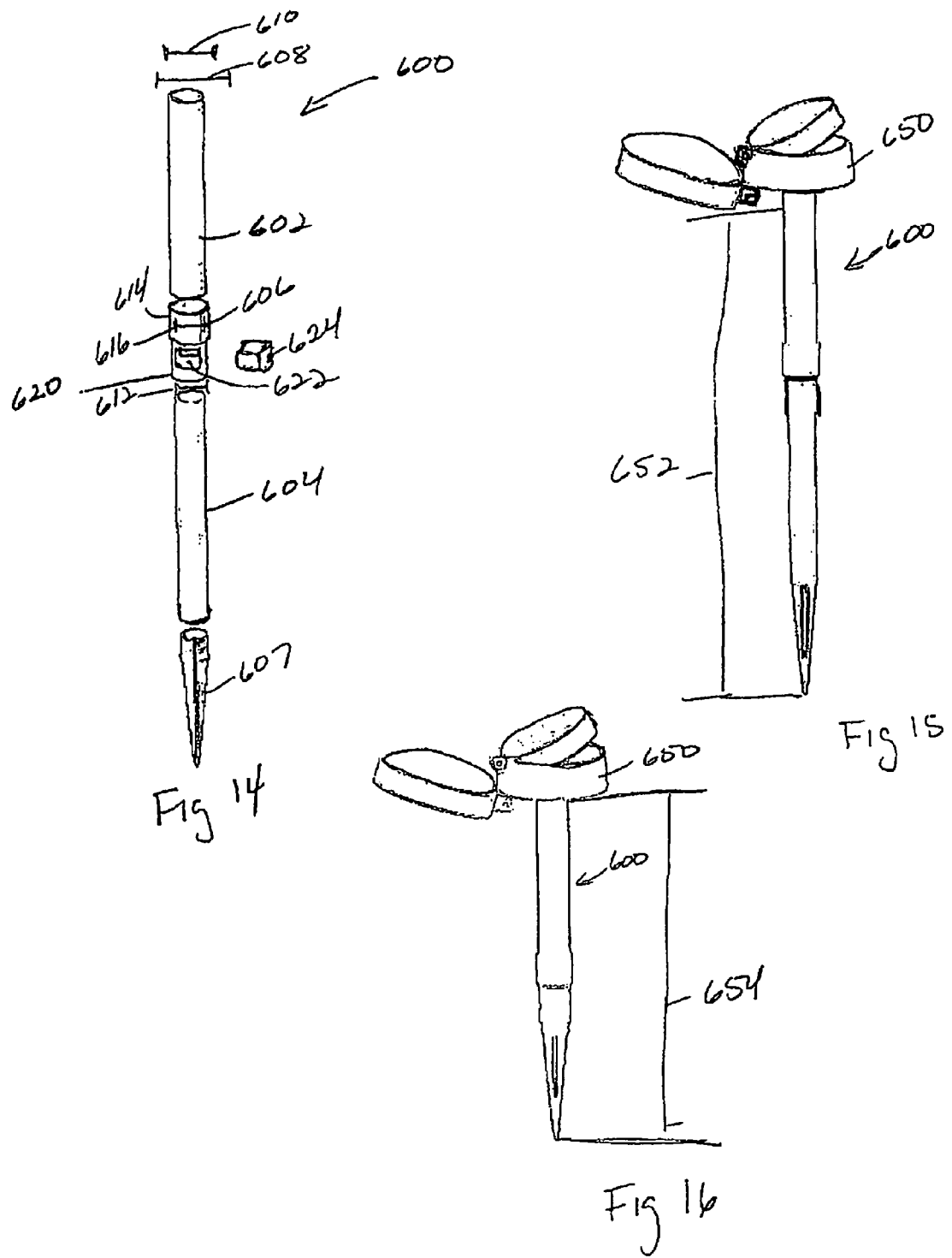

COMPACT SOLAR LIGHT ASSEMBLY

CROSS-REFERENCE TO RELATED APPLICATIONS

This application claims priority benefit to U.S. Provisional Application No. 61/407,512, which was filed on Oct. 28, 2010 and is titled "Lighting Assembly" (the "512 Application"). The entire disclosure of the '512 Application is incorporated by reference herein.

BACKGROUND OF THE INVENTION

The subject matter described herein relates to lighting assemblies and, more particularly, to solar lighting assemblies.

Solar lighting assemblies are commonly used for outdoor lighting. Solar lighting assemblies generally include a base configured to couple to a house or a deck. A housing is coupled to the base to house a solar panel. A lighting member is positioned within the housing. The lighting member may include a plurality of light emitting diodes (LEDs). The solar panel is electrically coupled to the lighting member to provide power to the lighting member.

However, conventional solar lighting assemblies are not without their disadvantages. In particular, the base of the solar lighting assembly is often required to be coupled to a support panel, for example, the side of a house or a deck. Conventional solar lighting assemblies are not configured to illuminate other aspects of an outdoor environment. For example, conventional lighting assemblies may not be capable of directing light onto a flower basket or pot. Conventional solar lighting assemblies also are not configured to direct light onto retaining walls or other landscaping features.

Additionally, conventional solar lighting assemblies may not be capable of adjusting the direction of light therefrom. As such, the use of such assemblies may be limited. Moreover, conventional solar lighting assemblies include fixed solar panels that may not adequately capture sunlight.

In addition, conventional solar lighting assemblies are not adjustable for compact storage or shipping. Some conventional solar lighting assemblies even require assembly after purchase.

A need remains for a solar lighting assembly that is more adaptable to outdoor landscaping. Another need remains for solar lighting assemblies that can be assembled during manufacturing and shipped in a compact container.

SUMMARY OF THE INVENTION

In one embodiment, a lighting assembly is provided including a support member having an opening therethrough. The support member is configured to rest on a member of an object so that the member of the object extends through the opening. A housing is hingedly attached to the support member. The housing is rotatable about the support member between a closed position and an open position. In the closed position, the housing is positioned within the support member. In the open position, the housing is positioned adjacent to the support member. A solar cell is positioned within a first side of the housing. A lighting member is powered by the solar cell. The lighting member is positioned in a second side of the housing. The second side of the housing is opposite the first side of the housing. The lighting member is configured to illuminate the object.

In another embodiment, a lighting assembly is provided including a support member configured to be joined to an object to be illuminated. The support member has an elongated member configured to position between adjacent members of the object. The support member has a base joined to the elongated member. The base has a first side and an opposite second side. A solar cell housing is rotatably attached to the first side of the base of the support member. The solar cell housing has a solar cell positioned therein. A lighting member is powered by the solar cell. The lighting member is hingedly attached to the support member adjacent to the base. The lighting member is rotatable between a closed position, wherein the lighting member is adjacent to the second side of the base, and an open position, wherein the lighting member is separated from the base.

In another embodiment, a lighting assembly is provided. The lighting assembly includes a support member configured to be joined to an object to be illuminated. The support member has an elongated member configured to be embedded within the object. The support member has a base joined to the elongated member. A solar cell housing is rotatably joined to the base. The solar cell housing has a solar cell positioned therein. A lighting member is powered by the solar cell. The lighting member is hingedly attached to the support member adjacent to the base. The lighting member is rotatable to direct light to the object.

BRIEF DESCRIPTION OF THE DRAWINGS

FIG. 6 is a side perspective view of the lighting assembly shown in FIG. 5 in a closed position.

FIG. 7 is a side view of a lighting assembly positioned on an object.

FIG. 8 is a side perspective view of a lighting assembly formed in accordance with another embodiment.

FIG. 13 is side cross-sectional view of the lighting assembly shown in FIG. 12.

FIG. 14 is a side view of an elongated member formed in accordance with an embodiment.

FIG. 15 is a side view of the elongated member shown in FIG. 14 in an extended position.

FIG. 16 is a side view of the elongated member shown in FIG. 14 in a retracted position.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
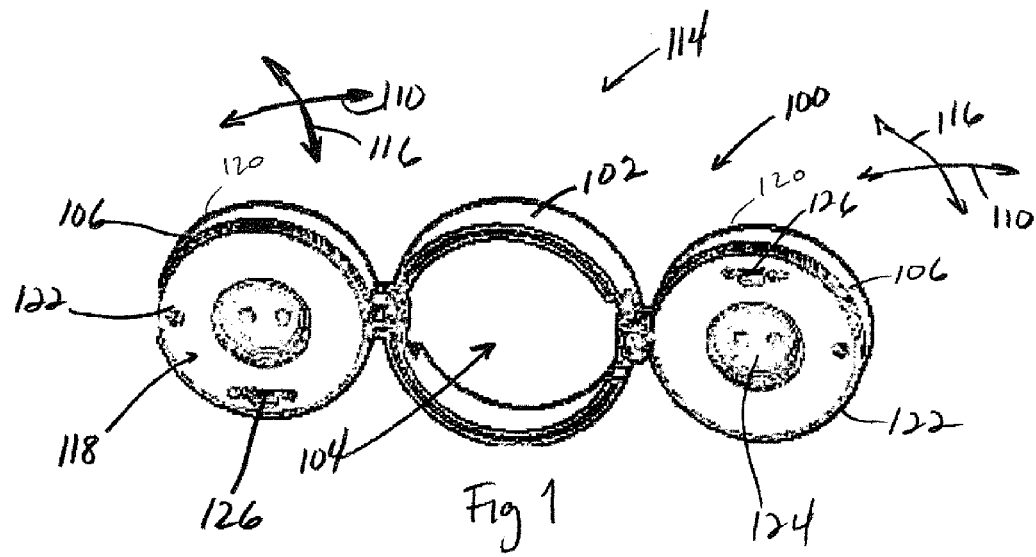
FIG. 1 is a top perspective view of a lighting assembly formed in accordance with an embodiment.

FIG. 1 illustrates a lighting assembly 100 formed in accordance with an embodiment. The lighting assembly 100 includes a support member 102. The support member 102 is formed as a ring having an opening 104 extending therethrough. Alternatively, the support member 102 may be formed in any shape having an opening therethrough. The support member 102 is configured to rest on a member of an object (not shown). The object is configured to be illuminated by the lighting assembly 100. The member of the object is configured to extend through the opening 104. In one embodiment, the member of the object extends entirely through the opening 104. In another embodiment, the member of the object extends only partially through the opening 104. The support member 102 positions on the member of the object so that the lighting assembly 100 illuminates the object.

A housing 106 is hingedly attached to the support member 102. In the illustrated embodiment, the lighting assembly 100 includes two housings 106 joined to the support member 102. The two housings 106 are positioned 180 degrees apart along a circumference of the support member 102. Each housing 106 is joined to the support member 102 via a hinge 108. The housing 106 rotates about the hinge 108 so that the housing 106 rotates with respect to the support member 102. The housing 106 rotates about the arrows 110 between a closed position 112 (shown in FIG. 3) and an open position 114. In the open position 114, the housing 106 is positioned adjacent to and extends from the support member 102. In one embodiment, the housing 106 may rotate with respect to the support member 102 about the arrows 116.

Figure 2:
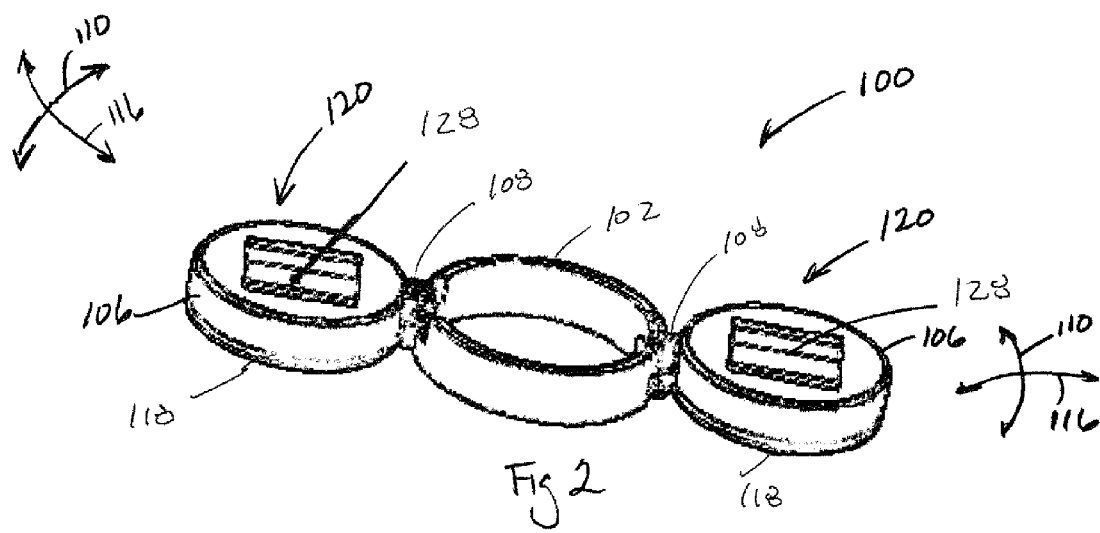
FIG. 2 is a bottom perspective view of the lighting assembly shown in FIG. 1.

The housing 106 includes a bottom side 118 and an opposite top side 120 (shown in FIG. 2). A lighting member 122 is positioned in the bottom side 118 of the housing 106. The lighting member 122 includes a light 124. The light 124 may be an LED and/or any other suitable light. A power switch 126 may also be positioned on the bottom side 118 of the housing 106. The power switch 126 is configured to control the operation of the light 124 of the lighting member 122. More specifically, the power switch 126 is operable to turn on and/or turn off the light 124. The light 124 is configured to illuminate the object. The housing 106 may be rotated about the hinge 108 to direct the light from the lighting member 122.

FIG. 2 illustrates the top side 120 of the housings 106 of the lighting assembly 100. The top side 120 of each housing 106 includes a solar cell 128. The solar cell 128 is electrically coupled to the lighting member 122. In operation, the solar cell 128 converts solar energy into an electrical signal that is utilized to provide power to the lighting member 122, and thus to provide power to the light 124. The housing 106 may be rotated about arrows 110 and/or 116 to position the solar cell within sunlight to provide power to the lighting assembly 100.

Figure 3:
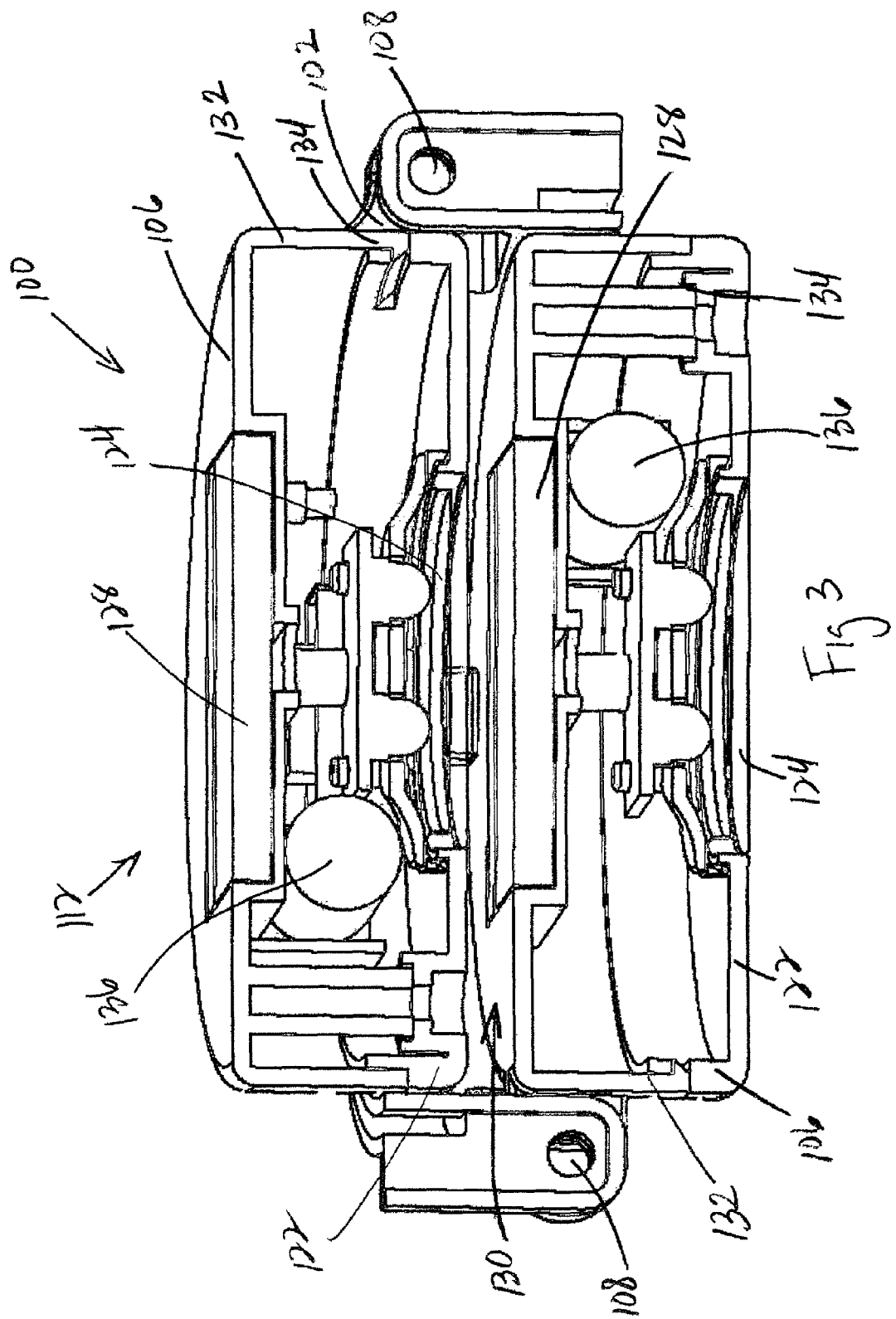
FIG. 3 is a cross-sectional side view of the lighting assembly shown in FIG. 1 in a closed position.

FIG. 3 illustrates the lighting assembly 100 in the closed position 112. In the closed position 112, the housings 106 are positioned within the support member 102. The housings 106 rotate about the hinge 108 into the closed position 112. The illustrated embodiment includes two housings 106. Each housing 106 is positioned within the support member 102. The housings 106 are positioned adjacent to one another. A space 130 is provided between the housings 106.

Each housing 106 includes the lighting member 122 and a solar cell housing 132. The solar cell 128 is positioned within the solar cell housing 132. The solar cell housing 132 is coupled to the lighting member 122. In one embodiment, the solar cell housing 132 and the lighting member 122 are coupled with latches 134. A battery 136 is positioned within the housing 106. The battery 136 is positioned between the solar cell housing 132 and the lighting member 122. The battery 136 is electrically coupled to the solar cell 128 and the light 124. The battery 136 stores power from the solar cell 128 and directs the power to the light 124.

In the closed position 112, the lighting assembly 100 has a smaller footprint than when the light assembly 100 is in the open position. Thus, the size of the lighting assembly 100 may be reduced to facilitate shipping. Moreover, because the size of the lighting assembly 100 package utilized to ship the lighting assembly 100 may be reduced by light assembly 100 is reduced for shipping, the size of the container utilized to ship the lighting assembly 100 may also be reduced. The lighting assembly 100 can therefore be packaged and sold in the closed position 112. Additionally, by coupling the various components of the lighting assembly 100 together using hinges, the lighting assembly 100 does not require assembly after purchase.

Figure 4:
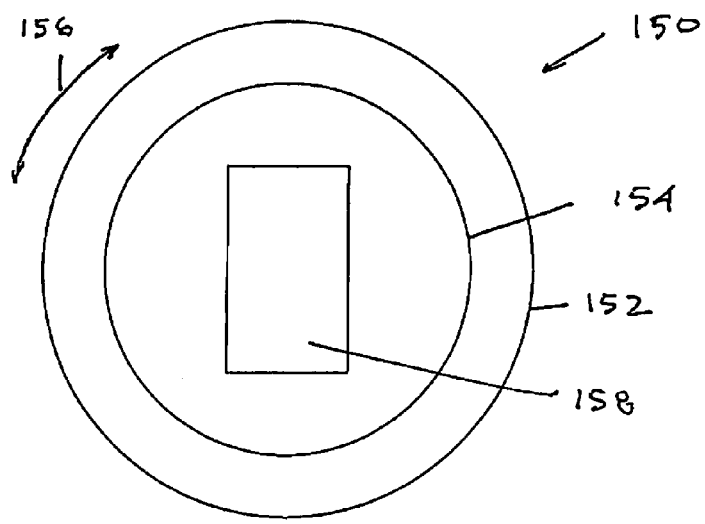
FIG. 4 is a bottom view of a housing formed in accordance with an embodiment.

FIG. 4 illustrates a housing 150 formed in accordance with an embodiment. The housing 150 may be a lighting member, for example, lighting member 122. Optionally, the housing 150 may be a solar cell housing, for example, solar cell housing 132. The housing 150 may be coupled to a support member, such as for example, support member 102 shown in FIG. 1. The housing 150 includes an outer housing 152 and an inner housing 154. The outer housing 152 is configured to attach to a support member, such as for example, the support member 102. In one embodiment, the outer housing 152 may be hingedly and/or rotatably attached to the support member 102.

The inner housing 154 is positioned within the outer housing 152. The inner housing 154 is configured to rotate in the direction of arrows 156 within the outer housing 152. The inner housing 154 includes an electrical component 158. The electrical component 158 may be a solar cell and/or a light. In one embodiment, the inner housing 154 includes a solar cell on one side and a light on the opposite side. The inner housing 154 rotates within the outer housing 152 to position the electrical component 158. For example, the electrical component 158 may be positioned to position a solar cell within sunlight and/or to direct light.

Figure 5:
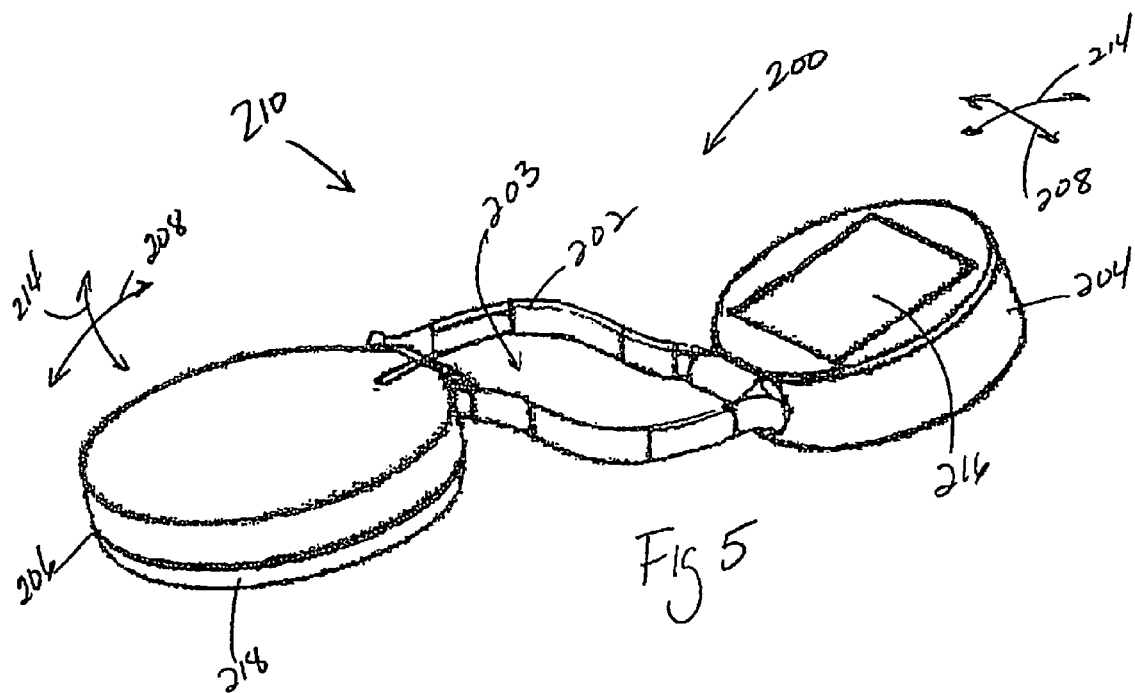
FIG. 5 is a top perspective view of a lighting assembly formed in accordance with another embodiment.

FIG. 5 illustrates a lighting assembly 200 formed in accordance with another embodiment. The lighting assembly 200 includes a flexible support member 202 having an opening 203 extending therethrough. The flexible support member 202 is configured to join to a member of an object (not shown) to be illuminated. The member of the object is configured to be received through the opening 203. A first housing 204 and a second housing 206 are hingedly attached to the support member 202. The first housing 204 and the second housing 206 are joined to opposite sides of the support member 202. The housings 204 and 206 rotate about the arrows 208 between an open position 210 (shown in FIG. 5) and a closed position 212 (shown in FIG. 6). The housings 204 and 206 may also rotate in the direction of arrows 214. In another embodiment, the housings 204 and 206 may include inner and outer housings and be configured to rotate as shown in FIG. 4.

The first housing 204 includes a solar cell 216 positioned therein. The second housing 206 includes a lighting member 218 joined thereto. The lighting member 218 includes a light 220 (shown in FIG. 6) positioned thereon. The lighting member 218 is electrically coupled to the solar cell 216. The solar cell 216 electrically powers the light 220 of the lighting member 218. In one embodiment, the first housing 204 may include a second lighting member powered by the solar cell 216. In another embodiment, the second housing 206 may include a second solar cell to power the light 220.

FIG. 6 illustrates the lighting assembly 200 in the closed position 212. In the closed position 212, the housings 204 and 206 are positioned within the support member 202. In the closed position 212, the first housing 204 is positioned adjacent to the second housing 206. In the closed position 212, the lighting assembly 200 is configured to reduce the size of a package utilized to ship the lighting assembly 200. The lighting assembly 200 can be shipped in the closed position 212 and does not require assembly after purchase.

FIG. 7 illustrates a lighting assembly 250 positioned on an object 252. The lighting assembly 250 may be one of lighting assembly 100 (shown in FIGS. 1-3) or lighting assembly 200 (shown in FIGS. 5 and 6). In the illustrated embodiment, the object 252 includes a basket 254 having wires 256 extending therefrom. The basket 254 is exemplary only and the lighting assembly 250 is not limited to use with the basket 254.

The lighting assembly 250 includes a support member 258 having an opening 260 therethrough. The support member 258 is positioned on the wires 256. The wires 256 extend through the opening 260 of the support member 258. Housings 262 extend from the support member 258. The housings 262 are configured to direct light 264 onto the basket 254.

FIG. 8 illustrates a lighting assembly 300 formed in accordance with an alternative embodiment. The lighting assembly 300 includes a support member 302 that is configured to be joined to an object (not shown) to be illuminated. The support member 302 is configured to position between adjacent members of the object. The support member 302 includes an elongated member 304 and a base 306. The elongated member 304 includes a first end 308 and a second end 310. The first end 308 is configured to be inserted between the members of the object. The base 306 is joined to the second end 310 of the elongated member 304. A plane 307 formed by the base 306 extends substantially parallel to a centerline 303 of the elongated member 304. The base 306 is generally circular and includes a first side 312 and an opposite second side 314.

A solar cell housing 316 is joined to the first side 312 of the base 306. The solar cell housing 316 is configured to rotate about the base 306 in the direction of arrows 318. The solar cell housing 316 is generally circular. The solar cell housing 316 includes and outer housing 320 having an outer wall 322. The outer wall 322 of the outer housing 320 is substantially flush with an outer circumference 323 of the base 306. An inner housing 324 is positioned within the outer housing 320. The inner housing 324 is hingedly attached to the outer housing 320. The inner housing 324 rotates with respect to the outer housing 320. The inner housing 324 rotates in the direction of arrows 318 between an open position 328 and a closed position 330 (shown in FIG. 9). In the open position 328 the inner housing 324 rotates away from the outer housing 320. In one embodiment, the inner housing 324 may rotate in the direction of arrows 326 when separated from the outer housing 320.

A solar cell 334 is positioned within the inner housing 324. The solar cell 334 is configured to convert sunlight to electrical signals. The inner housing 324 rotates with respect to the outer housing 320 to position the solar cell 334 within sunlight. The solar cell housing 316 rotates with respect to the base 306 to position to solar cell 334 in sunlight.

A lighting member 336 is hingedly attached to the support member 302. The lighting member 336 is hingedly attached to the support member 302 adjacent to the base 306. The lighting member 336 rotates in the direction of arrows 338 between an open position 340 and a closed position 342 (shown in FIG. 9). In one embodiment, the lighting member 336 may rotate in the direction of arrows 346 when in the open position 340. In the open position, the lighting member 336 is positioned distally from and separated from the base 306. The lighting member 336 includes a light 344 (shown in FIG. 10) positioned therein. The light 344 is electrically coupled to the solar cell 334. The solar cell 334 powers the light 344. The lighting member 336 rotates to direct light from the light 344 to the object.

In one embodiment, the lighting member 336 may include an inner and outer housing as illustrated in FIG. 4. The inner housing of the lighting member 336 may rotate within the outer housing of the lighting member 336.

Figure 9:
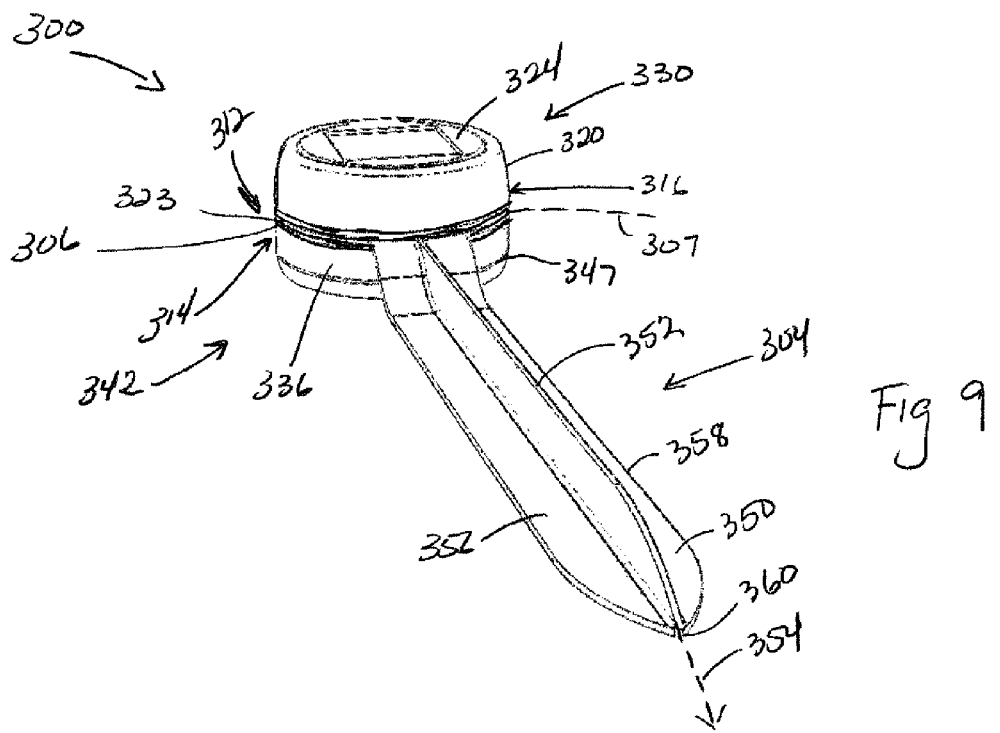
FIG. 9 is a side perspective view of the lighting assembly shown in FIG. 8 in a closed position.

FIG. 9 illustrates the lighting assembly 300 having the inner housing 324 of the solar cell housing 316 in the closed position 330 and the lighting member 336 in the closed position 342. In the closed position 330, the inner housing 324 is positioned within the outer housing 320 of the solar cell housing 322. The inner housing 324 is positioned adjacent to the first side 312 of the base 306. In the closed position 342 the lighting member 336 is positioned adjacent to the second side 314 of the base 306. The lighting member 336 has an outer wall 347 that is substantially flush with the outer circumference 323 of the base 306

The elongated member 304 includes a first flange 350 and a second flange 352. The first flange 350 has a centerline 354 that extends substantially parallel to the plane 307 formed by the base 306. The second flange 352 extends substantially perpendicular to the first flange 350. The second flange 352 extends substantially perpendicular to the plane 307 formed by the base 306. The second flange 352 extends along the centerline 354 of the first flange 350. The first flange 350 includes a first side 356 and a second side 358 that extend on opposite sides of the second flange 352. The first side 356 and the second side 358 of the first flange 350 taper inward to a point 360 at the first end 308 of the elongated member 304. The second flange 352 tapers inward to the point 360 at the first end 308 of the elongated member 304. The first flange 350 and the second flange 352 are configured to position between the members of the object.

Figure 10:
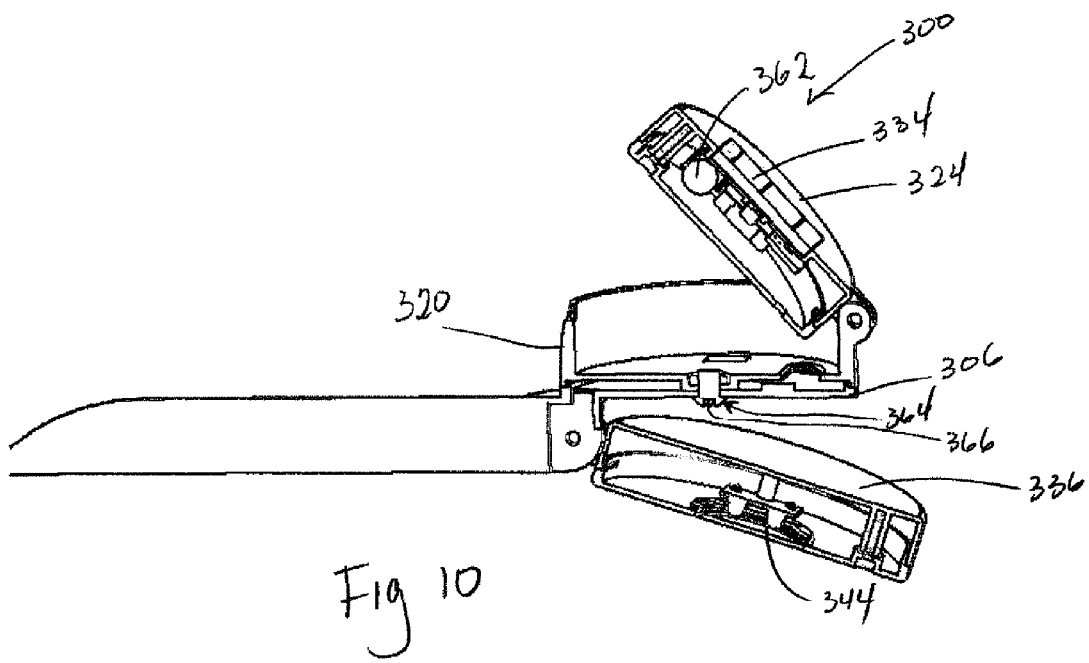
FIG. 10 is a side cross-sectional view of the lighting assembly shown in FIG. 8.

FIG. 10 illustrates a cross-sectional view of the lighting assembly 300. The light 344 is centered in the lighting member 336. The light 344 faces away from the base 306. The solar cell 334 is centered in the inner housing 324. The solar cell 334 is electrically coupled to a battery 362. The battery 362 stores energy collected by the solar cell 334. The battery 362 is electrically coupled to the light 334 to provide power to the light 334.

The base 306 includes an aperture 364 centered therein. The outer housing 320 of the solar cell housing 316 includes a tab 366 extending therefrom. The tab 366 is positioned within the aperture 364 to join the outer housing 320 to the base 306. The outer housing 320 rotates about the tab 366 so that the solar cell housing 316 rotates with respect to the base 306.

Figure 11:
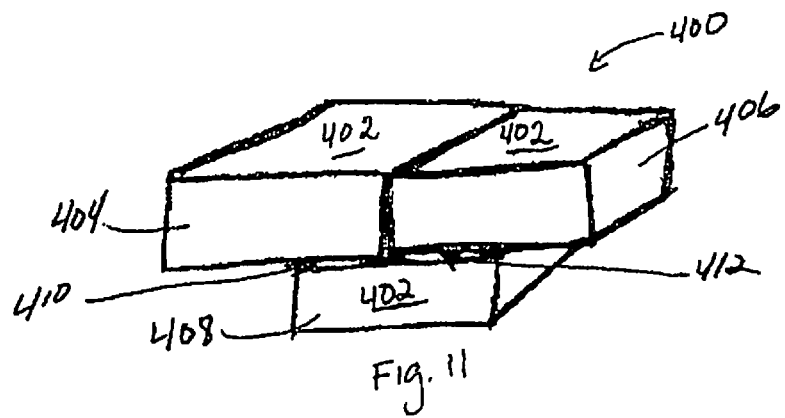
FIG. 11 is a side perspective view of an object configured to receive the elongated member shown in FIG. 8.

FIG. 11 illustrates an object 400 configured to receive the elongated member 304. The object 400 includes adjacent members 402. In one embodiment, the object 400 may be a retaining wall and the members 402 may be retaining stones. It should be noted that the embodiments described herein are not limited to use with a retaining wall. The members 402 include a first top member 404, a second top member 406, and a bottom member 408. An opening 410 is formed between the first top member 404 and the second top member 406. Another opening 412 is formed between the top members 404 and 406 and the bottom member 408. The first flange 350 of the elongated member 304 is configured to be received in the opening 412 and the second flange 352 is configured to be received in the opening 410 to secure the lighting assembly 300 to the object 400. The lighting assembly 300 is configured to illuminate the object 400.

Figure 12:
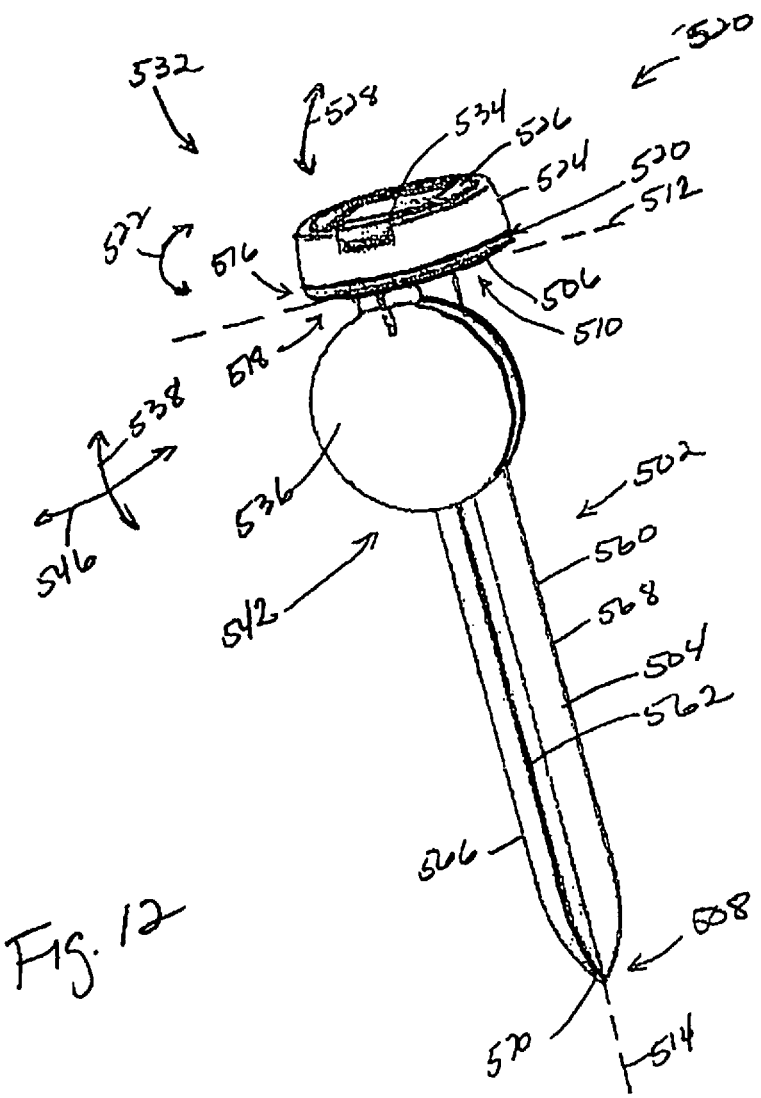
FIG. 12 is a side perspective view of a lighting assembly formed in accordance with another embodiment.

FIG. 12 illustrates a lighting assembly 500 formed in accordance with an alternative embodiment. The lighting assembly 500 includes a support member 502 having an elongated member 504 and a base 506. The elongated member 504 includes a first end 508 and a second end 510. The first end 508 is configured to be embedded within an object to be illuminated. The base 506 is joined to the second end 510 of the elongated member 504. A plane 512 formed by the base 506 extends substantially perpendicular to a centerline 514 of the elongated member 504. The base 506 includes a first side 516 and an opposite second side 518.

A solar cell housing 520 is joined to the first side 516 of the base 506. The solar cell housing 520 is configured to rotate about the base 506 in the direction of arrows 522. The solar cell housing 520 includes and outer housing 524 and an inner housing 526 positioned within the outer housing 524. The inner housing 526 is hingedly attached to the outer housing 524. The inner housing 526 rotates with respect to the outer housing 524. The inner housing 526 rotates in the direction of arrows 528 between an open position 530 (shown in FIG. 13) and a closed position 532. In the closed position 532, the inner housing 526 is positioned within the outer housing 524.

A solar cell 534 is positioned within the inner housing 526. The solar cell 534 is configured to convert sunlight to electrical signals. The inner housing 526 rotates with respect to the outer housing 524 to position the solar cell 534 within sunlight. The solar cell housing 520 rotates with respect to the base 506 to position to solar cell 534 in sunlight.

A lighting member 536 is hingedly attached to the support member 502. The lighting member 536 is hingedly attached to the support member 502 adjacent to the base 506. The lighting member 536 rotates in the direction of arrows 538 between an open position 540 (shown in FIG. 13) and a closed position 542. In one embodiment, the lighting member 536 may rotate in the direction of arrows 546 when in the open position 540.

In one embodiment, the lighting member 536 may include an inner and outer housing as illustrated in FIG. 4. The inner housing of the lighting member 536 may rotate within the outer housing of the lighting member 536.

The elongated member 504 includes a first flange 560 and a second flange 562. The first flange 560 has a centerline 564 that extends substantially perpendicular to the plane 512 formed by the base 506. The second flange 562 extends substantially perpendicular to the first flange 560. The second flange 562 extends substantially perpendicular to the plane 512 formed by the base 506. The second flange 562 extends along the centerline 564 of the first flange 560. The first flange 560 includes a first side 566 and a second side 568 that extend on opposite sides of the second flange 562. The first side 566 and the second side 568 of the first flange 560 taper inward to a point 570 at the first end 508 of the elongated member 504. The second flange 562 tapers inward to the point 570 at the first end 508 of the elongated member 504.

FIG. 13 illustrates the lighting assembly 500 having the inner housing 526 of the solar cell housing 520 in the open position 530 and the lighting member 536 in the open position 540. In the open position 530 the inner housing 526 rotates away from the outer housing 524. In one embodiment, the inner housing 526 may rotate in the direction of arrows 550 when separated from the outer housing 524. In the open position 530, the lighting member 536 is positioned distally from and separated from the base 506.

A light 572 is centered in the lighting member 536. The light 572 faces away from the base 506. The solar cell 534 is centered in the inner housing 526. The solar cell 534 is electrically coupled to a battery 574. The battery 574 stores energy collected by the solar cell 534. The battery 574 is electrically coupled to the light 572 to provide power to the light 572.

The base 506 includes an aperture 580 centered therein. The outer housing 524 of the solar cell housing 520 includes a tab 582 extending therefrom. The tab 582 is positioned within the aperture 580 to join the outer housing 524 to the base 506. The outer housing 524 rotates about the tab 582 so that the solar cell housing 520 rotates with respect to the base 506.

FIG. 14 is a side view of an elongated member 600 formed in accordance with an embodiment. The elongated member 600 includes an outer housing 602, an inner housing 604, and a transition member 606. A stake 607 is joined to the inner housing 604. The outer housing 602 has an outer diameter 608 and an inner diameter 610. The inner diameter 610 is less than the outer diameter 608. The inner housing 604 has an outer diameter 612 that is less than the inner diameter 610 of the outer housing 602. The transition member 606 includes an upper end 614 having an inner diameter 616 and a lower end 618 having an inner diameter 620.

The upper end 614 of the transition member 606 is sized to receive the outer housing 602 therein. The lower end 618 of the transition member 606 is sized to receive the inner housing 604 therein. The inner housing 604 is configured to slide through the transition member 606 and into the outer housing 602. The inner housing 604 is configured to slide through the outer housing 602 to adjust a height of the elongated member 600. The transition member 606 includes an opening 622 therethrough. The opening 622 is configured to receive a stopper 624. The stopper 624 frictionally engages the inner housing 604 to prevent the inner housing 604 from sliding through the outer housing 602.

FIGS. 15 and 16 illustrate the elongated member 600 joined to a lighting assembly 650. FIG. 15 illustrates the elongated member 600 in an extended position having a first height 652. FIG. 16 illustrates the elongated member 600 in a retracted position having a second height 654. The elongated member 600 is adjustable to any height between the first height 652 and the second height 654.

Figure 17:
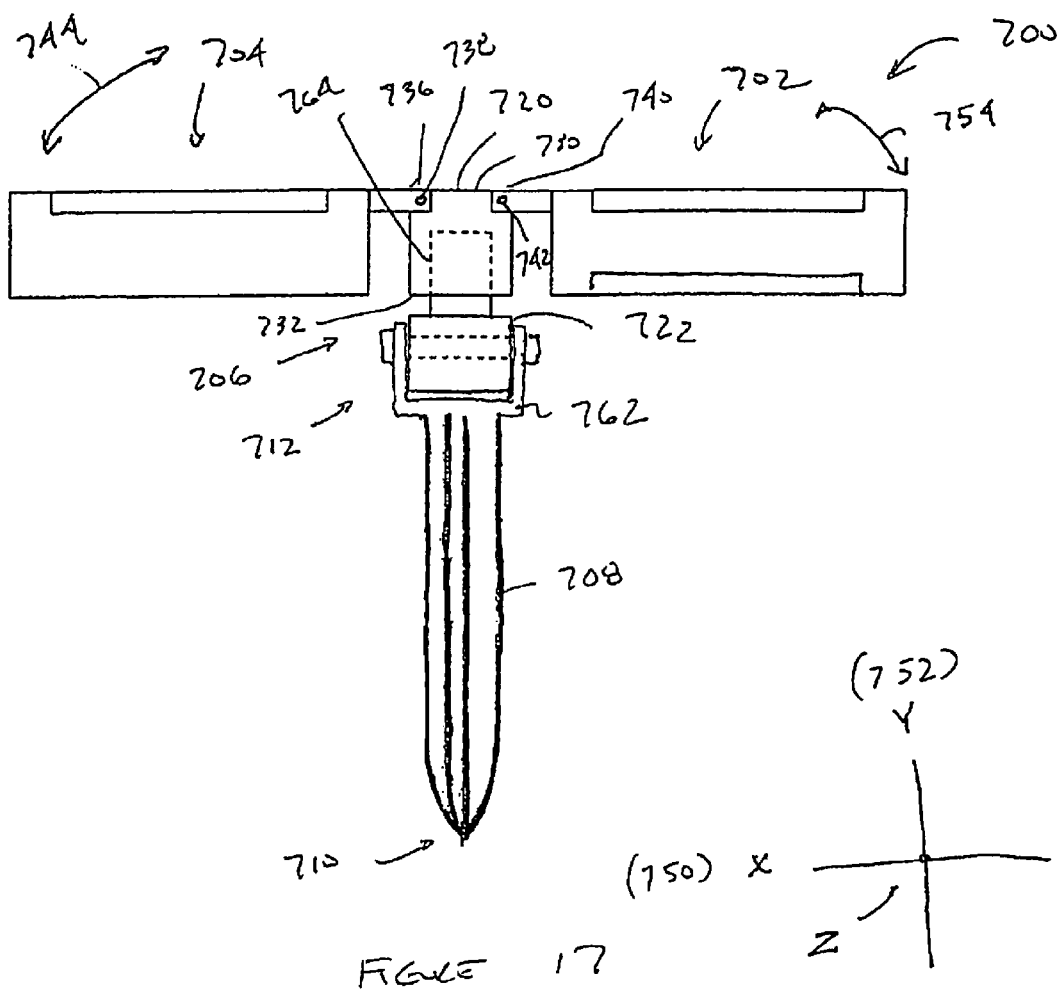
FIG. 17 is a side view of another lighting assembly formed in accordance with an embodiment.
Figure 18:
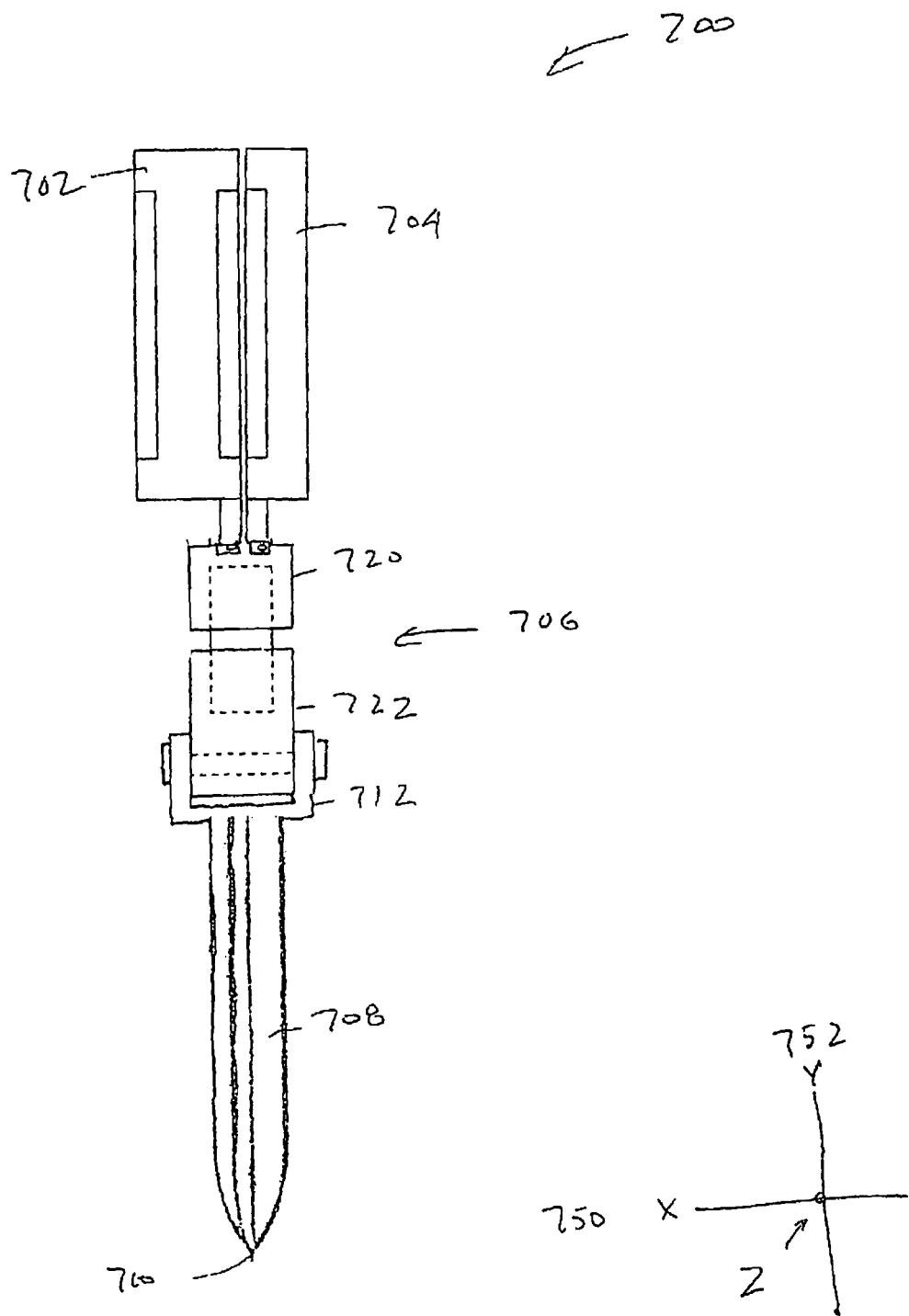
FIG. 18 is a side view of the lighting assembly shown in FIG. 17 in an operational configuration.
Figure 19:
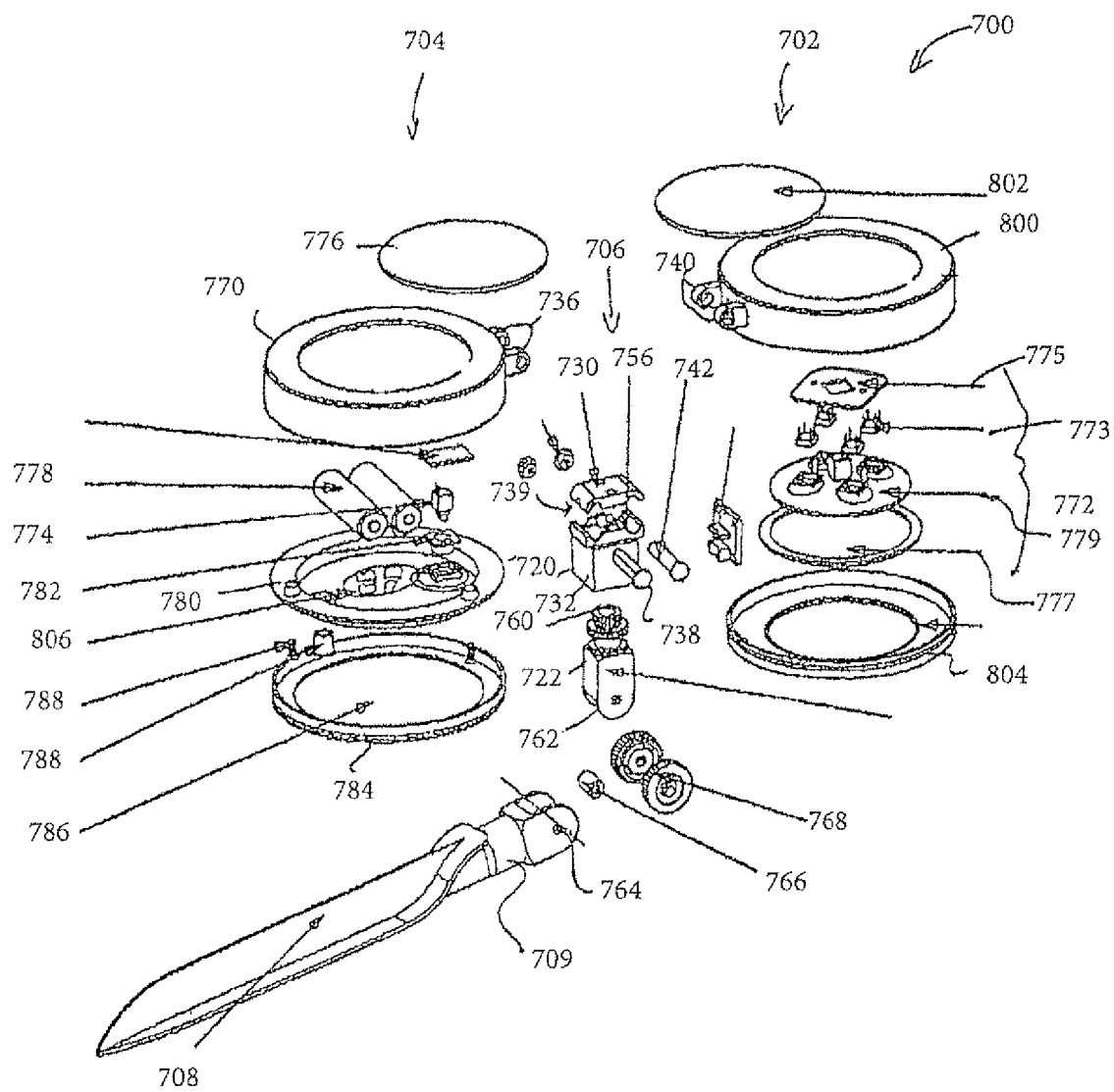
FIG. 19 is an exploded view of the lighting assembly shown in FIG. 17.

FIG. 17 is a side perspective view of another lighting assembly 700 in an open or operational configuration. FIG. 18 is a side perspective view of the lighting assembly 700 in a closed or shipping configuration. FIG. 19 is an exploded view of the lighting assembly 700 shown in FIG. 17. As shown in FIGS. 18 and 18, the lighting assembly 700 generally includes a lighting portion 702, a solar panel portion 704, a rotatable hinge assembly 706 and an elongated member 708. The elongated member 708 includes a first end 710 and a second end 712. The first end 710 is configured to be embedded within an object or surface to be illuminated. The second end 712 is configured to couple to the hinge assembly 706 as described in more detail below.

The hinge assembly 706 includes a first hinge portion 720 that is adapted to couple to both the lighting portion 702 and the solar panel portion 704. The hinge assembly 706 also includes a second hinge portion 722 that is adapted to couple the first hinge portion 720 to the second end 712 of the elongated member 708.

As shown in FIG. 19, the first hinge portion 720 includes a first end 730 and an opposing second end 732. The first end 730 defines a pair of openings 734 and 736 extending at least partially therethrough. In the exemplary embodiment, the solar panel portion 704 includes a pair of tabs 736. During assembly, the pair of tabs 736 is aligned with the opening 734. A pin 738 is then inserted through the opening 734 to secure the tabs 736 to the first hinge portion 720. In this manner, the solar panel portion 704 is rotatably coupled to the first hinge portion 720. Similarly, the lighting portion 702 includes a pair of tabs 740 that are configured to mate with the opening 736. A pin 742 is then inserted through the opening 736 to secure the tabs 740 to the first hinge portion 720. In this manner, the lighting portion 702 is rotatably coupled to the first hinge portion 720.

Referring again to FIG. 17, in operation, the combination of the tabs 736 and the pin 738 enable the solar panel portion 704 to rotate along a substantially ninety degree arc denoted by an arrow 744. More specifically, assuming that the lighting portion 702 and the solar panel portion 704 are arranged along a plane, denoted as an x-axis 750, the combination of the tabs 736 and the pin 738 enable the solar panel portion 704 to rotate from an initial, or open, position that is substantially parallel to the x-axis plane 750 to a closed, or shipping, position that is approximately parallel to a y-plane 752 and thus approximately perpendicular to the x-plane 750. It should be realized that the solar panel portion 704 may be disposed at any location between the open position and the closed position.

Similarly, in operation, the combination of the tabs 740 and the pin 742 enables the lighting portion 702 to rotate along a substantially ninety degree arc denoted by an arrow 754. More specifically, assuming that the lighting portion 702 is located along the same plane as the solar panel portion 704, denoted as the x-axis 750, the combination of the tabs 740 and the pin 742 also enable the lighting portion 702 to rotate from an initial, or open, position (shown in FIG. 17) that is substantially parallel to the x-axis plane 750 to a closed, or shipping, position (shown in FIG. 18) that is approximately parallel to a y-plane 752 and thus approximately perpendicular to the x-plane 750. It should be realized that the lighting portion 702 may be disposed at any location between the open position and the closed position. It should also be realized that when the lighting assembly is fully extended, the lighting portion 702 is substantially parallel to the solar panel portion 704.

Referring again to FIG. 19, the second hinge portion 722 is adapted to couple the first hinge portion 720 to the second end 712 of the elongated member 708. Accordingly, the second hinge portion 722 includes a first end 760 and an opposing second end 762. The first end 760 has a substantially round shape and this forms a cylinder. During assembly, the first end 760 is adapted to be inserted within an opening 764 (shown in FIG. 17) formed in the first hinge portion 722. The first end 760 may include a plurality of protrusions that are configured to contact a plurality of slots formed in the opening 764. In operation, the combination of the opening 764 and the cylindrically shaped first end 760 enables the operator to rotate the first hinge portion 722, and thus the lighting portion 702 and the solar panel portion 704, with respect to the second hinge portion. Moreover, the combination of the slots and protrusions enables the first hinge portion 722, and thus the lighting portion 702 and the solar panel portion 704, to be secured in a particular position after being adjusted by the operator.

Referring again to FIG. 19, the second end 762 of the second hinge portion 722 is also adapted to couple the second hinge portion 722 to the elongated member 708. Accordingly, in the exemplary embodiment, the second end 762 is formed as a clevis. Clevis as used herein is defined as a coupling device having a substantially u shape. The clevis 762 thus includes a pair of openings 764 to enable a mechanical fastener 766 to be inserted therethrough. The clevis end 762 may also include a pair of grooved devices 768 that enable the second hinge portion 722 to be secured in a particular position after being adjusted by the operator. During assembly, the clevis, or second end 762 is utilized to couple the second hinge portion 722 to the elongated member 708.

Referring again to FIG. 17, in operation, the second hinge portion 722 enables the first hinge portion 720, and thus the lighting portion 702 and the solar panel portion 704 to rotate about the y-axis 752. In the exemplary embodiment, the second hinge portion 722 therefore enables the lighting portion 702 and the solar panel portion 704 to rotate 180 degrees around the y-axis. Thus, the lighting portion 702 and the solar panel portion 704 may be positioned at any respective position about the 360 degree axis. Accordingly, the hinge assembly 706 enables the lighting portion 702 and the solar power portion 704 to be positioned in any location along an x-axis, a y-axis, and/or a z-axis.

Referring again to FIG. 19, in the exemplary embodiment, the solar panel portion 704 includes at least a housing 770, a light switch 774, a solar cell 776, and at least one battery 778. The light switch 774 and the at least one battery 778 may be coupled to a board 780. As shown in FIG. 19, the light switch 774 may be installed in a receptacle 782. The panel portion 704 may also include a cover 784 that is configured to retain the light switch 774, the solar cell 776, the at least one battery 778, and the board 780 within the housing 770. The cover 784 may include a substantially clear lens 786 to enable, light generated by an optional light 806 to be transmitted to a region outside of the lighting assembly 700. The cover 784 may be coupled to the housing 770 using a plurality of tabs 788.

In operation, the solar cell 776 converts solar energy into electrical energy that may be stored in the battery 778. The light switch 774 may then be operated to electrically couple the battery 778 to the light 772. More specifically, in the exemplary embodiment, the light switch 774 is depressed to activate the light 772. Depressing the light switch 774 once, turns the lights 772 on and depressing the light switch 774 a second time turns the lights 772 off. It should be realized that the lighting assembly 700 may be powered by solar light or optionally using power stored in the batteries 778.

The light portion 702 includes at least a housing 800, a solar cell 802, a cover 804, and the light 772. The light 772 may be embodied as a plurality of LEDs 773 that are secured to a circuit board 775. The LEDs 773 may extend at least partially through a lens cover 779 that is secured within the housing using the cover 804. A gasket 777 may be installed between the cover 804 and the housing 800 to facilitating moistuer from entering the light portion 702. In operation, the solar cell 802 converts solar energy into electrical energy that may be stored in the battery 778. The light switch 774 may then be operated to electrically couple the battery 778 to the lights 772 and/or the lights 806 if utilized. In various embodiments, the elongated member 708 may include a telescoping portion 709 that enables the light portion 702 and the solar panel portion 704 to be extended or retracted from the elongated member 708. More specifically, the elongated member 708 enables the light assembly 700 to be securely coupled to a wall or the ground, the telescoping portion 709 may then be operated to reposition the light portion 702 and the solar panel portion 704 as desired.

Figure 20:
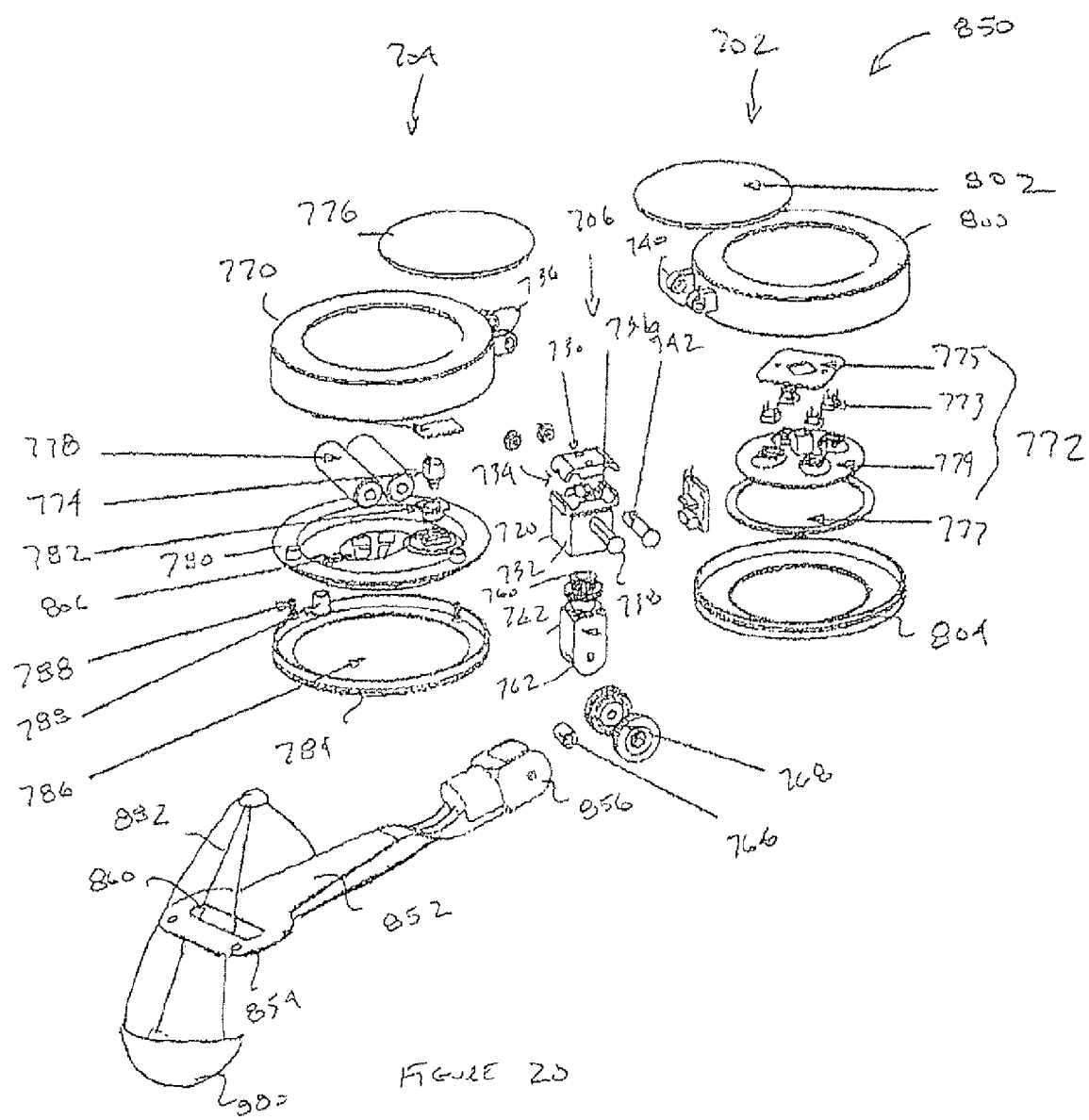
FIG. 20 is an exploded view of another exemplary lighting assembly formed in accordance with an embodiment.

FIG. 20 is an exploded view of another exemplary lighting assembly 850. In the exemplary embodiment, the lighting assembly 850 is substantially the same as the lighting assembly 700 described above. Accordingly, the lighting assembly 850 includes the lighting portion 702, the solar panel portion 704, and the rotatable hinge assembly 706. In the exemplary embodiment, the lighting assembly 850 also includes an elongated member 852. The elongated member 852 includes a first end 854 and a second end 856. The first end 854 is configured to be embedded within an object or embedded between two objects. For example, the first end 854 may be embedded between two landscaping bricks to enable the lighting assembly 850 to illuminate a landscaping wall, or house, for example. The second end 856 is configured to couple to the hinge assembly 706 as described as described above.

In the exemplary embodiment, the first end 854 also includes an opening 860 extending therethrough. The opening 860 enables the lighting assembly 850 to be attached to a hanging basket 880, for example. More specifically, at least one cable 882 may be inserted through the opening 860. The cable 882 has a first end that is coupled to a ring that secures the basket 880 while the cable second end secures to the basket 880. A third cable may be utilized to secure the elongated member 852 in a substantially fixed position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A lighting assembly comprising:
   a support member having an opening therethrough, the support member configured to rest on a member of an object so that the member of the object extends through the opening;
   a housing hingedly attached to the support member, the housing rotatable about the support member between a closed position and an open position, wherein, in the closed position, the housing is positioned within the support member and, in the open position, the housing is positioned adjacent to the support member;
   a solar cell positioned within a first side of the housing; and
   a lighting member powered by the solar cell, the lighting member positioned in a second side of the housing, the second side of the housing opposite the first side of the housing, the lighting member configured to illuminate the object.

2. The lighting assembly of claim 1, wherein the housing is rotatable about the support member to position the solar cell within sunlight.

3. The lighting assembly of claim 1, wherein the housing is rotatable about the support member to direct light from the lighting member.

4. The lighting assembly of claim 1, wherein the housing includes an outer housing hingedly attached to the support member and an inner housing rotatably attached within the outer housing, the solar cell and the lighting member positioned within the inner housing.

5. The lighting assembly of claim 1, wherein the housing is a first housing, the assembly further comprising a second housing hingedly attached to the support member, the second housing rotatable with respect to the support member between a closed position and an open position, wherein, in the closed position, the second housing is positioned within the support member adjacent to the first housing and, in the open position, the second housing is positioned adjacent to the support member opposite the first housing.

6. The lighting assembly of claim 1, wherein the housing is a first housing, the assembly further comprising a second housing hingedly attached to the support member, the second housing having a lighting member powered by the solar cell of the first housing.

7. The lighting assembly of claim 1, wherein the support member is flexible.

8. A lighting assembly comprising:
   a support member configured to be joined to an object to be illuminated, the support member having an elongated member configured to position between adjacent members of the object, the support member having a base joined to the elongated member, the base having a first side and an opposite second side;
   a solar cell housing rotatably attached to the first side of the base of the support member, the solar cell housing having a solar cell positioned therein; and
   a lighting member powered by the solar cell, the lighting member hingedly attached to the support member adjacent to the base, the lighting member rotatable between a closed position, wherein the lighting member is adjacent to the second side of the base, and an open position, wherein the lighting member is separated from the base.

9. The lighting assembly of claim 8, wherein the solar cell housing includes an outer housing rotatably attached to the first side of the base and an inner housing hingedly attached to the outer housing, the solar cell positioned within the inner housing.

10. The lighting assembly of claim 8, wherein the lighting member is rotatable to direct light on the object.

11. The lighting assembly of claim 8, wherein the elongated member includes a first flange and a second flange extending substantially perpendicular to the first flange.

12. The lighting assembly of claim 8, wherein the base extends substantially parallel to a centerline of the elongated member.

13. The lighting assembly of claim 8, wherein the lighting member includes an outer housing hingedly attached to the support member and an inner housing rotatably attached within the outer housing.

14. The lighting assembly of claim 9, wherein the inner housing rotates between a closed position, wherein the inner housing is positioned within the outer housing, and an open position, wherein the inner housing is separated from the outer housing.

15. The lighting assembly of claim 9, wherein the inner housing rotates to position the solar cell in sunlight.

16. The lighting assembly of claim 9, wherein, in the closed position, the inner housing is positioned adjacent to the base.

17. The lighting assembly of claim 11, wherein the second flange extends along a centerline of the first flange.

18. The lighting assembly of claim 11, wherein the first and second flange are configured to be positioned between members of the object.

19. A lighting assembly comprising:
   a support member configured to be joined to an object to be illuminated, the support member having an elongated member configured to be embedded within the object, the support member having a base joined to the elongated member;
   a solar cell housing rotatably joined to the base, the solar cell housing having a solar cell positioned therein; and
   a lighting member powered by the solar cell, the lighting member hingedly attached to the support member adjacent to the base, the lighting member rotatable to direct light to the object.

20. The lighting assembly of claim 19, wherein the base extends substantially perpendicular to a centerline of the elongated member.

21. The lighting assembly of claim 19, wherein the solar cell housing includes an outer housing rotatably attached to the base and an inner housing hingedly attached to the outer housing, the solar cell positioned within the inner housing.

22. The lighting assembly of claim 19, wherein the lighting member includes an outer housing attached to the support member and an inner housing rotatably attached within the outer housing.

23. The lighting assembly of claim 19, wherein the elongated member includes a first flange and a second flange extending substantially perpendicular to the first flange.

24. The lighting assembly of claim 21, wherein the inner housing rotates with respect to the outer housing to position the solar cell within sunlight.

25. The lighting assembly of claim 23, wherein the second flange extends along a centerline of the first flange.

26. The lighting assembly of claim 19, wherein the elongated member extends between a first height and a second height, the second height less than the first height.

27. A lighting assembly comprising:
   a lighting portion;
   a solar panel portion;
   an elongated member; and
   a hinge assembly coupled between the lighting portion, the solar panel portion, and the elongated member, the hinge assembly being configured to enable the lighting portion and the solar panel portion to rotate approximately 360 degrees around an x-axis and to also rotate approximately 180 degrees around a y-axis.

28. The lighting assembly in accordance with claim 27, wherein the lighting portion includes a light, a light switch electrically coupled to the light, the light switch being movable to activate and deactivate the light light.

29. The lighting assembly in accordance with claim 27, wherein the hinge assembly comprises:
   a first hinge portion coupled between the lighting portion and the solar panel portion; and
   a second hinge portion coupled between the first hinge portion and the elongated member, the second hinge portion being rotatable with respect to the first hinge portion.

30. The lighting assembly in accordance with claim 27, wherein the hinge assembly comprises a first hinge portion coupled between the lighting portion and the solar panel portion; the first hinge portion configured to enable the lighting portion and the solar panel portion to be movable from an open position to a closed position.

31. The lighting assembly of claim 27, wherein the hinge assembly comprises a clevis to couple the elongated member to the lighting portion or the solar panel portion.

32. The lighting assembly of claim 27, wherein the solar panel assembly is electrically coupled to the light assembly portion, the solar panel portion configured to provide power to the light assembly portion.

33. The lighting assembly of claim 27, wherein the solar panel assembly further includes a light.

34. The lighting assembly of claim 27, wherein the lighting portion further includes a solar panel.

* * * * *